United States Patent
Schaevitz et al.

(10) Patent No.: US 6,908,594 B1
(45) Date of Patent: Jun. 21, 2005

(54) EFFICIENT MICROFLUIDIC SEALING

(75) Inventors: Samuel Benjamin Schaevitz, San Rafael, CA (US); Travis Boone, San Mateo, CA (US); Torleif Ove Bjornson, Gilroy, CA (US)

(73) Assignee: Aclara Biosciences, Inc., Mountain View, CA (US)

( * ) Notice: Subject to any disclaimer, the term of this patent is extended or adjusted under 35 U.S.C. 154(b) by 0 days.

(21) Appl. No.: 09/691,957

(22) Filed: Oct. 18, 2000

Related U.S. Application Data

(60) Provisional application No. 60/161,203, filed on Oct. 22, 1999.

(51) Int. Cl.[7] ............................ G01N 15/06; B01L 9/00; B01L 3/00; B01L 3/02; B01L 11/00
(52) U.S. Cl. ............................ 422/104; 422/50; 422/55; 422/58; 422/68.1; 422/81; 422/82; 422/82.05; 422/99; 422/100; 422/101; 422/102; 422/103; 436/43; 436/52; 436/53; 204/451; 204/452; 204/453; 204/455; 204/600; 204/601; 204/602; 204/603; 204/604; 204/605
(58) Field of Search .................. 422/99, 100, 101, 422/102, 103, 104, 50, 55, 58, 68.1, 81, 82, 82.05; 204/451, 452, 453, 455, 601, 602, 603, 604, 605, 600; 436/43, 52, 53

(56) References Cited

U.S. PATENT DOCUMENTS

| | | | | |
|---|---|---|---|---|
| 3,649,464 A | * | 3/1972 | Freeman | 435/305.2 |
| 4,038,149 A | * | 7/1977 | Liner et al. | 435/305.3 |
| 4,154,795 A | * | 5/1979 | Thorne | 422/99 |
| 4,948,442 A | * | 8/1990 | Manns | 156/73.1 |
| 5,047,215 A | * | 9/1991 | Manns | 422/101 |
| 5,084,246 A | * | 1/1992 | Lyman et al. | 422/101 |
| 5,141,719 A | * | 8/1992 | Fernwood et al. | 422/101 |
| 5,227,137 A | | 7/1993 | Monti et al. | |
| 5,252,294 A | | 10/1993 | Kroy et al. | |
| 5,273,718 A | * | 12/1993 | Skold et al. | 422/101 |
| 5,326,533 A | * | 7/1994 | Lee et al. | 422/101 |
| 5,443,890 A | | 8/1995 | Öhman | |
| 5,484,731 A | * | 1/1996 | Stevens | 435/305.3 |
| 5,545,280 A | | 8/1996 | Wenz | |
| 5,597,731 A | * | 1/1997 | Young et al. | 435/284.1 |
| 5,604,130 A | * | 2/1997 | Warner et al. | 435/286.7 |
| 5,679,310 A | * | 10/1997 | Manns | 422/102 |
| 5,846,396 A | | 12/1998 | Zanzucchi et al. | |
| 5,890,745 A | * | 4/1999 | Kovacs | 285/24 |
| 5,961,926 A | * | 10/1999 | Kolb et al. | 422/101 |
| 6,039,804 A | * | 3/2000 | Kim et al. | 117/206 |
| 6,043,880 A | * | 3/2000 | Andrews et al. | 356/311 |
| 6,074,614 A | * | 6/2000 | Hafeman et al. | 422/102 |
| 6,083,761 A | * | 7/2000 | Kedar et al. | 436/178 |
| 6,106,783 A | * | 8/2000 | Gamble | 422/102 |
| 6,251,343 B1 | * | 6/2001 | Dubrow et al. | 422/102 |
| 6,258,325 B1 | * | 7/2001 | Sanadi | 422/101 |
| 6,267,858 B1 | * | 7/2001 | Parce et al. | 204/600 |
| 6,500,390 B1 | * | 12/2002 | Boulton et al. | 422/100 |

FOREIGN PATENT DOCUMENTS

| | | |
|---|---|---|
| WO | WO 94/12405 | 6/1994 |
| WO | WO 97/37755 | 10/1997 |
| WO | WO 99/15876 | 4/1999 |
| WO | WO 99/43432 | 9/1999 |

* cited by examiner

*Primary Examiner*—Jill Warden
*Assistant Examiner*—Brian J. Sines
(74) *Attorney, Agent, or Firm*—Stephen C Macevicz; David Albagli

(57) ABSTRACT

Improved sealing for microstructures in microfluidic devices having a plurality of units is provided by providing collars surrounding the openings to the microstructures, such as reservoirs. The collars are protrusions extending from the surface of the devices and the internal walls of the collars generally aligned with the internal walls of the microstructure. Conformable and/or adhesive lids are employed for sealing the microstructures.

6 Claims, 3 Drawing Sheets

EFFICIENT MICROFLUIDIC SEALING

CROSS-REFERENCE TO RELATED APPLICATIONS

This application claims the benefit of the filing date of U.S. provisional application 60/161,203 filed Oct. 22, 1999, which disclosure is hereby incorporated by reference.

INTRODUCTION

1. Field of the Invention

The field of this invention is microfluidic devices.

2. Background

Microfluidic devices offer great promise for the accurate manipulation of very small volumes, the rapid execution of a wide variety of operations, the minimal use of reagents, as well as many other benefits. As with all situations, the benefits come with challenges. For many purposes, one wishes to have a number of independent electrokinetic units in a single substrate. Since each unit will frequently comprise a plurality of reservoirs and channels, it is important that the individual units do not communicate except as required by the design of the device. Also important to consider is the problem of evaporation with the very small volumes that are frequently involved with the operations. Where there is an interest in doing a quantitative analysis of an operation involving kinetics, it is important that the solvent volume remain substantially constant, so that the concentrations of the reactants are not changing due to decreasing volume. To this end, methods are required to minimize evaporation. Additionally, particularly where long incubation times and/or long reaction times are involved, there is an interest in preventing contamination. A further concern is unintentional pressurization, during dosing of a microstructure vessel, which could prematurely move the liquid from a reservoir into a channel.

In response to these concerns, lids have been used to seal the ports of microfluidic devices. Lids may provide sealing through the pressure of their weight, by providing adhesion, using various forms of latches or clasps, or by fitting snugly around a part of the microfluidic device and held by friction.

There is an interest in developing devices and methods to substantially diminish the undesired events that may occur due to open ports of a microfluidic device, where the devices are effective and can be readily fabricated and methods readily performed.

U.S. Pat. No. 5,443,890 and references cited therein describe leakage-proof sealing of microfluidic devices. WO 99/43432 describes microfluidic devices and systems incorporating cover layers. U.S. Pat. No. 5,545,280 describes applying adhesive to protrusions on a substrate.

SUMMARY OF THE INVENTION

Improved microfluidic devices are provided for use in performing operations involving the manipulation of small volumes. Substrates are formed comprising channels and reservoirs, where the channels communicate with the reservoirs and the channels are otherwise enclosed, and the reservoirs have an aligned collar in relief, extending beyond the planar surface of the substrate and outwardly from the border of the reservoir. The reservoirs are more efficiently sealed with an appropriate cover which contacts the crown of the collar. The substrates may be formed by plastic molding or other means. Of particular interest are devices employing electrokinesis for movement of solutions from one site to another in the device, where the substrate comprises a plurality of individual electrokinetic units and the volumes involved generally are below about 5 µl.

BRIEF DESCRIPTION OF THE DRAWINGS

FIG. 1a is a cross-sectional view of the device of FIG. 1 along the partial phantom line 1a—1a;

DESCRIPTION OF THE SPECIFIC EMBODIMENTS

Figure 1:
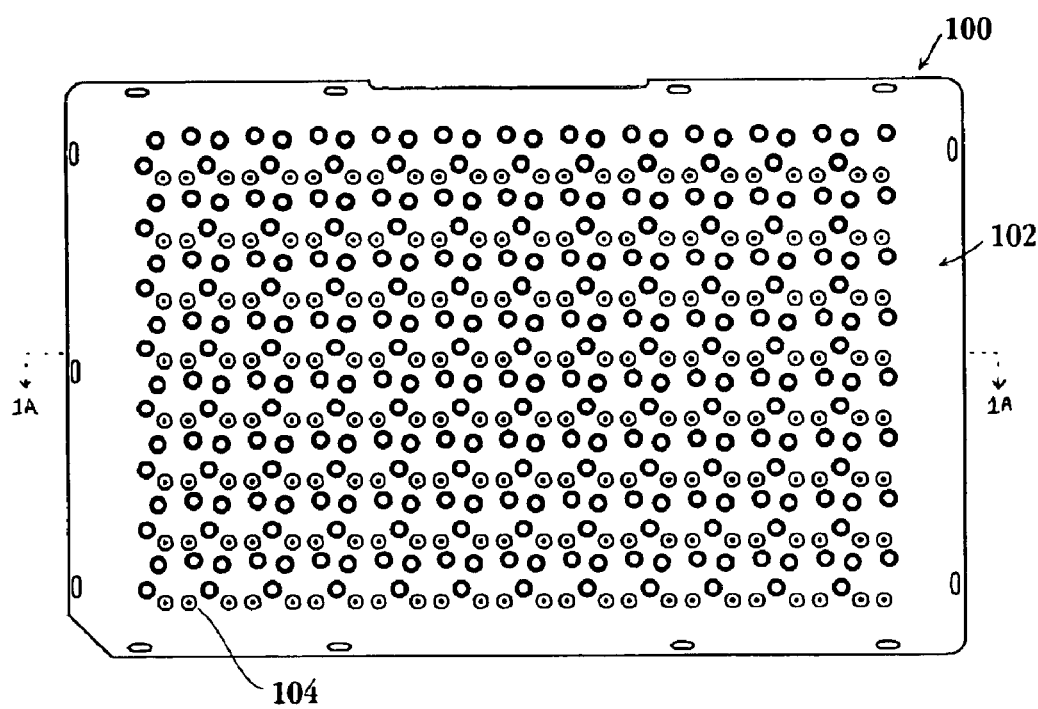
FIG. 1 is a plan view of a device with collars around microstructures.

The following examples are offered by way of illustration of the present invention, not limitation. Microfluidic devices are provided for manipulation of small volumes, where the devices comprise a substrate, usually an organic substrate in which there are channels and reservoirs, where the reservoirs have a raised collar above the planar surface of the substrate. A bottom film, including a rigid substrate, is adhered to and encloses the channels and the bottoms of the reservoirs. The reservoirs can be sealed on the top side using a film, which seals to the upper surface of the collar.

The microfluidic devices will be characterized by having one or more operational units present in the substrate, where the number of units may vary from 16 to 1536 units, more usually not more than about 384 units, the number of units frequently being related to the number of wells in a microtiter well plate. Each unit will have at least one channel and at least two reservoirs, usually having at least two channels and at least four reservoirs. The total number of reservoirs for a device will generally be in the range of about 4 to 1600, more usually in the range of about 64 to 1500.

The sealing cover or lid will be a film, which forms a seal about the collar to at least substantially inhibit fluid flow from the reservoir. The cover will provide for sealing interaction with the collar upper surface, as a result of a compliant surface contacting the collar or an adhesive surface adhering to the upper surface of the collar, particularly an adhesive surface, which is removable. Contact will usually be minimal or not at all between the sealing cover or lid and the planar surface. The forces providing the sealing may be gravity, adhesive forces, or mechanical forces. For compliant surfaces, such as elastomeric films, skin-surface (closed-cell) foams, soft films, pressure would be applied. The pressure may be a result of a weighted backing, or a latching or gripping device for holding the film against the collars. The pressure may further be a result of a vacuum chuck which holds the film in position and can release the film, as appropriate, etc. The film may be stretched across the collars, held in position by clasps at he periphery of the substrate, a sealing pliable band around the periphery, a vacuum chuck, etc. A continuous sealing film may be used, which may be unrolled from a reel as the devices are moved in a continuous manner, for example, on a wheel or moving belt. The films may be natural rubber, polyisoprene, ethylene-propylene elastomers, polyurethane foams, polydimethylsiloxane, etc. The films may be thin or thick, so long as they have a minimum dimension, which provides for their sealing of the collars. Generally, the films will be at least about 50 µm in thickness. Alternatively, films may be used, which have a thin adherent layer, which will adhere to the surface of the collar and after the film has fulfilled its function, the adhesive may be removed. Useful adhesives include pressure sensitive adhesives, such as ethylene-containing polymers, urethane polymers, butyl rubber, butadiene-acrylonitrile polymers, butadiene-acrylonitrile-isoprene polymers, and the like. See, for example, U.S. Pat. No. 5,908,695 and references cited therein.

The substrate will generally have a thickness of at least about 20 µm, more usually at least about 40 µm, and not more than about 0.5 cm, usually not more than about 0.25 cm. The width of the substrate will be determined by the number of units to be accommodated and may be as small as about 2 mm and up to about 6 cm or more. The dimension in the other direction will generally be at least about 0.5 cm and not more than about 20 cm, usually not more than about 10 cm. The substrate may be a flexible film or relatively inflexible solid, where the microstructures, such as reservoirs and channels, may be provided by embossing, molding, machining, etc. The collars may be formed at the same time using the same process, although more expensive processes may be used, such as photolithography or laser ablation. In this case, the collar regions would be protected while the substrate was eroded. The channel dimensions will generally be in the range of about 0.1 $\mu$mm to 1 mm deep and about 0.5 $\mu$m to 500 $\mu$m wide, where the cross-section will generally be 0.1 $\mu m^2$ to about 0.25 $mm^2$. The channel lengths will vary widely depending on the operation for which the channel is to be used, generally being in the range of about 20 nl to 1 $\mu$m. The reservoirs may be cylindrically shaped or conically shaped, particularly inverted cones, where the diameter of the port will be from about 1.5 to 25 times, usually 1.5 to 15 times, the diameter of the bottom of the reservoir, where the reservoir connects to the channel.

Whether the microfeatures are left open will depend upon (i) whether a supporting film and/or an enclosing film is provided and/or (ii) whether the device is produced by embossing a film or by molding. The supporting film will generally be at least about 40 $\mu$m and not more than about 5 mm thick. The film used to enclose the channels and the bottom of the reservoirs will generally have a thickness in the range of about 10 $\mu$m to 2 mm, more usually in the range of about 20 $\mu$m to 1 mm. The selected thickness is primarily one of convenience and assurance of good sealing and the manner in which the devices will be used to accommodate instrumentation. Therefore, the ranges are not critical.

The collars surrounding the reservoir ports will generally have a height from the planar surface of the substrate in the range of about 0.1 to 1 mm, more usually about 0.2 to 1 mm, and preferably about 0.25 to 0.75 mm. The crown will be thick enough to provide a good seal between the sealing film or lid and the crown, so that usually it will be about 0.05 to 1 mm thick, more usually about 0.1 to about 0.5 mm thick. The collars may be considered extensions of the inner walls of the microstructures, having an inner wall aligned with the inner wall of the microstructure, where the collars then extend outwardly from the inner wall, much like the structure of a volcano. Alternatively, the collar inner wall may be displaced from the reservoir inner wall, generally displaced less than about 1 mm, usually less than about 0.5 mm and may be less than about 0.1 mm. In this way the inner wall is offset from the edge of the reservoir, serving as a fence around the reservoir.

The area occupied by a single unit will vary widely, depending on the number of units of the device, the function of the units, and the like. As illustrative, for the most part, where the devices are designed to be compatible with 96 to 384 microtiter well plates, the units will have from about 4.5 to 9 mm spacings.

As indicated, the substrate may be a flexible film or inflexible solid, so the method of fabrication will vary with the nature of the substrate. For embossing, at least two films will be used, where the films may be drawn from rolls, one film embossed ant the other film adhered to the embossed film to provide a physical support. The individual units may be scored, so as to be capable of being used separately, or the roll of devices retained intact. See, for example, application serial no. PCT/98/21869. Where the devices are fabricated individually, they will usually be molded, using conventional molding techniques. The substrates and accompanying film will generally be plastic, particularly organic polymers, where the polymers include additional polymers, such as polyethers, polyesters, polyamides, polyimides, etc. Desirably, the polymers will have low fluorescence inherently or can be made to have low fluorescence by additives or bleaching. The underlying enclosing film will then be adhered to a substrate by any convenient means, such as thermal bonding, adhesives, etc. The literature has many examples of adhering such films, see, for example, U.S. Pat. Nos. 4,558,333; and 5,500,071.

Liquids may be moved through the units by any convenient means, including electrokinesis, pneumatics, sonics, thermal, etc. Electrokinetic devices will usually have two or more reservoirs connected by microchannels, where the microchannels may cross, providing for injection of a plug from one microchannel into another microchannel. The devices may find use in sequencing of nucleic acids, detection of binding between two entities, e.g. proteins with proteins, small molecules or cells, or various assays for the determination of drugs, single nucleotide polymorphisms, etc.

The methods employing the subject devices may be associated with the transfer to the microstructures of the devices of volumes ranging from about 10 nl to 500 $\mu$l, with reaction volumes ranging from about 20 nl to 0.5 ml, usually 50 nl to 0.1 ml. The volumes may be transferred by any efficient means, including pins, inkjet dispensers, other piezoelectric devices, pipettes, etc. After the liquid is dispensed, the applicable seal may be applied. Instead of dispensing liquid into the microstructure, the process may involve withdrawing liquid from the microstructure. Where the seal is in place, the seal would be removed, the liquid withdrawn from the microstructure and the seal replaced. In this way the integrity of the concentration of the solution in the microstructure may be maintained. Alternatively, one may have a self-sealing film, where the seal would be pierced for the transfer of liquid.

Figure 1A:
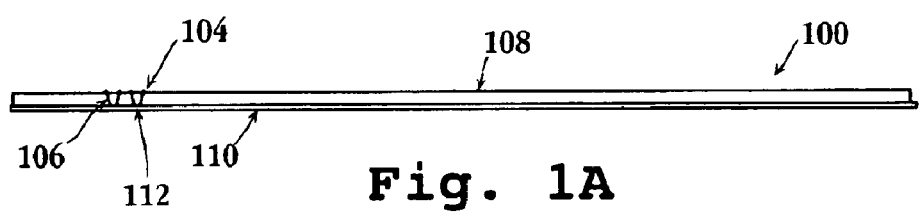

For further understanding of the invention, the drawings will now be considered. In FIG. 1 is depicted a plan view of a microfluidic device having 96 units with the spacing appropriate to a 96 well microtiter plate, where the spacing of the collars is shown. The device 100 has a substrate 102 with collars 104 associated with the reservoirs 106. In FIG. 1a, a cross-sectional view is shown of the device 100. The device 100 is shown with reservoirs 106, only two reservoirs being shown for clarity. Above the reservoirs 106 on the upper planar surface 108 of the device are collars 104. An enclosing film 110 provides the bottom of the device, serving to enclose the reservoirs 106 and channels 112.

Figure 2:
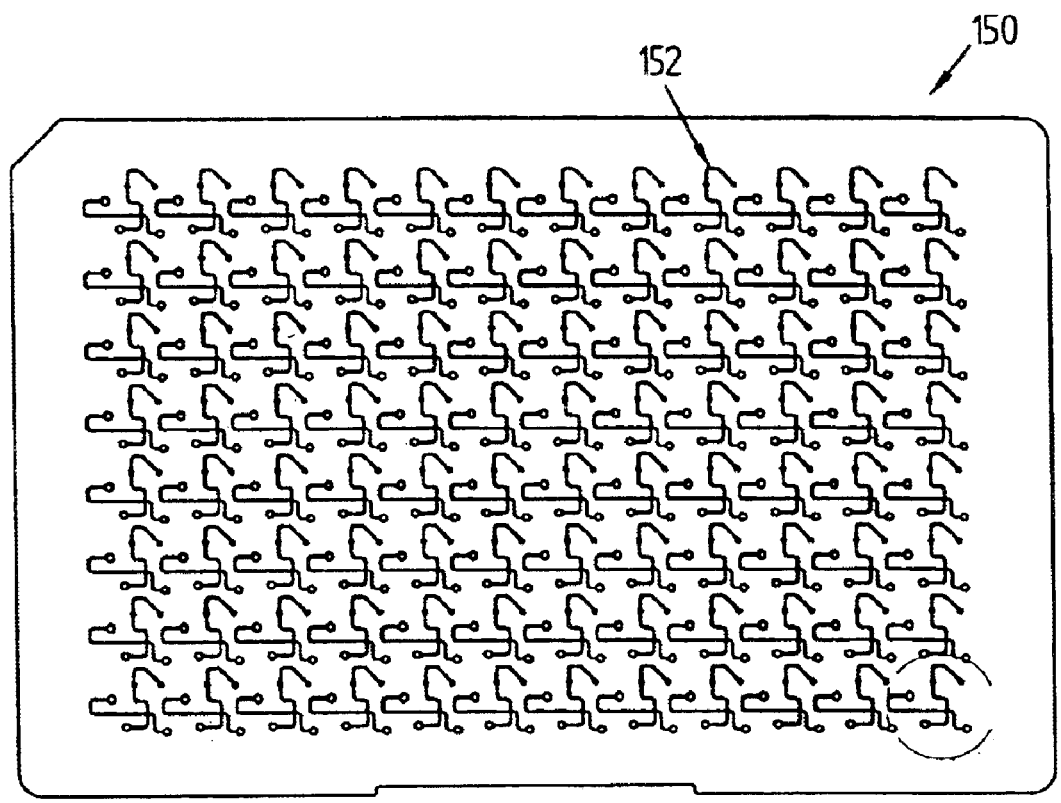
FIG. 2 is a plan view of the device of FIG. 1, with the collars removed to provide details of the individual units.
Figure 2A:
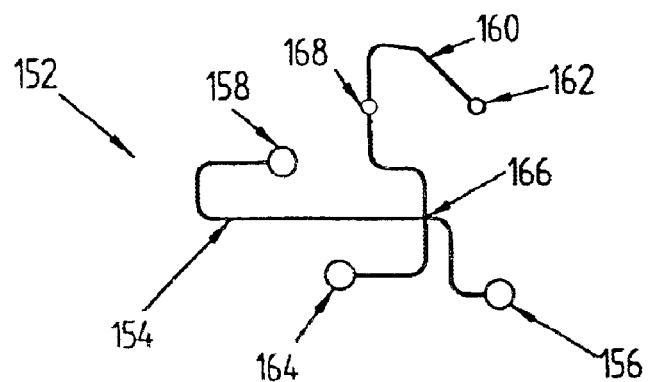
FIG. 2a is a diagrammatic exploded view of the units of FIG. 2.

In FIG. 2, the device 150 is shown with the sealing film removed to provide the detail of the individual microfluidic units 152. An expanded version of the microfluidic units 152 is depicted in a diagrammatic plan view in FIG. 2a. This unit is for illustration purposes only and demonstrates a unit for performing a reaction with incubation, followed by separating the components of the reaction mixture using electrophoresis and identifying the product with a detector, not shown. The unit 152 has a separation channel 154, beginning with electrophoresis buffer reservoir 156 and terminating in waste reservoir 158. The assay channel 160 begins with a reagent incubation reservoir 162 and ends with a second waste reservoir 164. The reagent incubation reservoir 162 receives the various components of the reaction where the reagents may react. Some of the liquid in the reagent incubation reservoir 162 may wick by capillary action through the separation channel to a stop-junction reservoir 168 provided in assay channel 160 to stop the movement of the reaction solution. After sufficient time for incubation liquid remaining in the reagent incubation reservoir 162 is moved by pressure to the stop-junction reservoir 168 and the electrophoretic process begun by introducing electrodes into the waste reservoirs 158 and 164, the stop-junction reservoir 168 and the buffer reservoir 156. By activating the electrodes in the stop-junction reservoir 168 and the waste reservoir 164, the reaction components may be moved to cross-section 166 for injection into separation channel 154. The electrodes in the reservoirs 164 and 168 may then be allowed to float, while the electrodes in buffer reservoir 156 and waste reservoir 158 are activated for electrophoretic transport and separation in separation channel 154 for detection of product.

Figure 3:
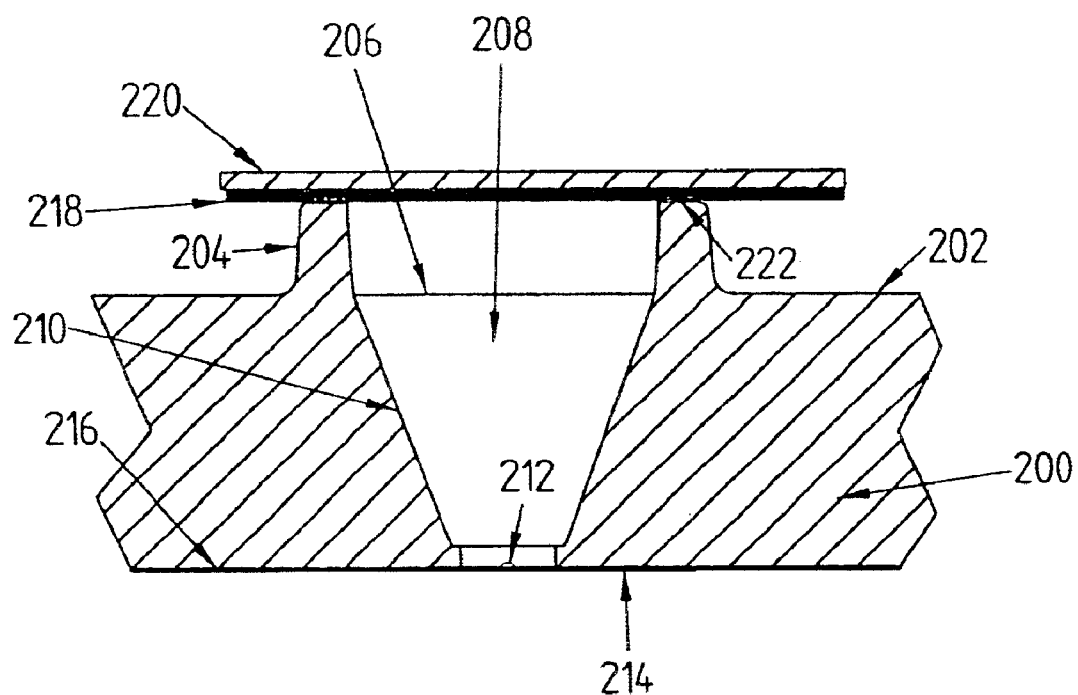
FIG. 3 is a side elevation cross-sectional view of a reservoir microstructure of a unit with a cover.

In FIG. 3 is shown a cross-section of a reservoir with the collar on a substrate. The substrate 200 has an upper planar surface 202. Extending upward from upper planar surface 202 is the external wall of collar 204. As shown in the Figure, the collar 204 meets with the upper opening 206 of reservoir 208. The wall 210 of reservoir 208 is shown as conical having a linearly even surface, but could be vertical or irregular, as needed. The reservoir wall 210 is aligned with the collar wall 204, having a smooth transition, being a single feature when molding the substrate. As already indicated, the collar inner wall may be offset from the port edge. The reservoir 208 terminates at the bottom into channel 212. The channel 212 is enclosed by film 214, which adheres to the bottom surface 216 of the substrate. The reservoir 208 is enclosed by a conformable cover film 218, backed by a weighted backing 220, to hold the film 218 in sealing relationship with the top surface 222 of collar 204.

The subject invention provides many advantages in enclosing, usually reversibly, small reservoirs or other microstructure. The subject collar structure has a small contact area, which serves to concentrate the force produced by whatever means of application of the lid onto a much smaller area, as compared to a cover which bonds to the entire surface of the device. A reduction in differential pressures created during application of the lid is achieved. Where the upper surface is flat, without areas in relief, a conformal lid comes down in such a way that it will usually first make contact with a large ring around the area to be sealed. The air trapped within this ring is pressurized into the volume to be sealed. By contrast, with the subject structure the lid makes contact before it reaches the device main surface, and thereby avoiding the problem of trapping large volumes of air in the sealed area. In addition, for lid attachment mechanisms like gravity, friction and mechanical clips, where the force is not directly related to the contact area, the subject method increases the local pressure with which the lid is attached to the part. This increased pressure generally improves the seal and improves the proximity of conformal lids. This improved seal can enable the use of a weighted lid to produce an airtight seal without requiring a large mass or an extremely conformable lid material. Where the seal is substantially air tight, the lid will act to resist or prevent fluid flow. Capillary stop junctions may be prone to failure by condensation or other mechanism, in which case the sealed lid provides a backup mechanism. Also, the sealed lid can easily counteract relatively strong fluidic forces, such as surface tension. Yet another advantage of the collar is that the effective leakage path (surface path) between two adjacent wells is increased. This increases the resistance to arcing due to high differential voltages in two adjacent wells. In fact, multiple concentric collars would be beneficial in further reducing this problem. Finally, during application and removal of a lid, there is a potential for liquids to wick between the lid and the surface of the device and microstructures. The short distance between the device and the lid can result in very strong capillary pressures. In the subject invention the lid is only in close proximity to the collar surface, so that fluid can only wick along that surface. By avoiding continuous ridges between different microstructures, movement of liquid between the microstructures can be obviated.

All publications and patent applications mentioned in this specification are indicative of the level of skill of those skilled in the art to which this invention pertains. All publications and patent applications mentioned in this specification are herein incorporated by reference to the same extent as if each individual publication or patent application was specifically and individually indicated to be incorporated by reference.

The invention now having been fully described, it will be apparent to one of ordinary skill in the art that many changes and modifications can be made thereto without departing from the spirit or scope of the appended claims.

What is claimed is:

1. A microfluidic device comprising:

a substrate having a planar surface and at least one microfluidic unit formed therein, each microfluidic unit having at least one reservoir with an opening in said surface such that said opening is surrounded by a collar in relief, and wherein said collar is covered with a lid of a conformable material and wherein said collar has its inner surface aligned with the inner surface of said opening and a thickness of from about 0.05 to 0.5 mm thick extending away from said inner surface.

2. A microfluidic device according to claim 1 produced by plastic molding.

3. A microfluidic device comprising:

a substrate having a planar surface and at least one microfluidic unit formed therein, each microfluidic unit comprising one or more operational units each comprising at least two reservoirs connected by at least one microchannel in said substrate wherein each of such reservoirs has an opening in said surface and a volume in the range of about 10 nl to 10 $\mu$l, such that each said opening is surrounded by a collar in relief, said collar being covered with a lid of a conformable material;

and such that each said opening has an inner surface aligned with an inner surface of a reservoir and the collar has a height in the range of about 0.1 to 1 mm and a thickness of from about 0.05 to 0.5 mm thick extending away from said inner surface.

4. A microfluidic device according to claim 3, wherein at least a portion of said reservoirs are positioned in accordance with a 96, 384 or 1536 microtiter well format.

5. A microfluidic device according to claim 3, wherein said lid is a portion of a continuous film.

6. A microfluidic device according to claim 3, wherein said substrate comprises an acrylic polymer and is molded.

* * * * *